US009407572B2

(12) United States Patent
Ferris

(10) Patent No.: US 9,407,572 B2
(45) Date of Patent: Aug. 2, 2016

(54) MULTIPLE CLOUD MARKETPLACE AGGREGATION

(71) Applicant: Red Hat, Inc., Raleigh, NC (US)

(72) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 10 days.

(21) Appl. No.: 14/691,276

(22) Filed: Apr. 20, 2015

(65) Prior Publication Data
US 2015/0229580 A1 Aug. 13, 2015

Related U.S. Application Data

(63) Continuation of application No. 12/324,758, filed on Nov. 26, 2008, now Pat. No. 9,037,692.

(51) Int. Cl.
| G06F 15/177 | (2006.01) |
| H04L 12/917 | (2013.01) |
| G06F 9/50 | (2006.01) |
| G06Q 30/06 | (2012.01) |
| H04L 29/08 | (2006.01) |
| G06F 9/445 | (2006.01) |

(52) U.S. Cl.
CPC .............. *H04L 47/76* (2013.01); *G06F 9/5027* (2013.01); *G06F 9/5072* (2013.01); *G06Q 30/06* (2013.01); *H04L 67/10* (2013.01); *G06F 8/65* (2013.01); *G06F 2209/5015* (2013.01)

(58) Field of Classification Search
CPC ....... H04L 47/76; H04L 67/10; G06F 9/5072; G06F 9/5027; G06F 8/65; G06F 2209/5015; G06Q 30/06
See application file for complete search history.

(56) References Cited

U.S. PATENT DOCUMENTS

| 6,463,457 | B1 | 10/2002 | Armentrout et al. |
| 7,313,796 | B2 | 12/2007 | Hamilton, II et al. |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 7,644,019 | B2 * | 1/2010 | Woda et al. ..................... 705/35 |
| 8,250,215 | B2 * | 8/2012 | Stienhans et al. ............. 709/227 |
| 2001/0039497 | A1 | 11/2001 | Hubbard |
| 2002/0069276 | A1 | 6/2002 | Hino et al. |
| 2002/0165819 | A1 | 11/2002 | McKnight et al. |
| 2003/0037258 | A1 | 2/2003 | Koren |
| 2003/0110252 | A1 | 6/2003 | Yang-Huffman |
| 2003/0135609 | A1 | 7/2003 | Carlson et al. |
| 2004/0162902 | A1 | 8/2004 | Davis |
| 2004/0210591 | A1 | 10/2004 | Hirschfeld et al. |

(Continued)

OTHER PUBLICATIONS

"rBuilder and the rPath Appliance Platform", 2007 rPath, Inc., www.rpath.com. 3 pages.

(Continued)

*Primary Examiner* — Cheikh Ndiaye
(74) *Attorney, Agent, or Firm* — Lowenstein Sandler LLP

(57) ABSTRACT

A processor replicates a request for a computer resource to a plurality of clouds, and updates a repository in view of resource offerings received from the plurality of clouds. The repository stores resource and service data for each cloud. The processor identifies resource and service data in the repository that match information specified in the request in view of the updated repository, and provides information to a requesting entity indicating resource and service data in the repository satisfy the request.

20 Claims, 6 Drawing Sheets

(56) References Cited

U.S. PATENT DOCUMENTS

| | | |
|---|---|---|
| 2004/0240627 A1 | 12/2004 | Nakajima |
| 2004/0268347 A1 | 12/2004 | Knauerhase et al. |
| 2005/0144060 A1 | 6/2005 | Chen et al. |
| 2005/0149294 A1* | 7/2005 | Gebhart .................. 702/186 |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1* | 4/2008 | Meijer et al. .................. 370/254 |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0162625 A1* | 7/2008 | Sedayao et al. .............. 709/202 |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0216999 A1* | 8/2009 | Gebhart et al. ................. 712/36 |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1* | 2/2010 | Stienhans et al. ............. 709/226 |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0107103 A1 | 5/2011 | DeHaan et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2011/0213686 A1 | 9/2011 | Ferris et al. |
| 2011/0213687 A1 | 9/2011 | Ferris et al. |
| 2011/0213691 A1 | 9/2011 | Ferris et al. |
| 2011/0213713 A1 | 9/2011 | Ferris et al. |
| 2011/0213719 A1 | 9/2011 | Ferris et al. |
| 2011/0213875 A1 | 9/2011 | Ferris et al. |
| 2011/0213884 A1 | 9/2011 | Ferris et al. |
| 2011/0214124 A1 | 9/2011 | Ferris et al. |
| 2011/0295727 A1 | 12/2011 | Ferris et al. |
| 2011/0295986 A1 | 12/2011 | Ferris et al. |
| 2011/0295998 A1 | 12/2011 | Ferris et al. |
| 2011/0295999 A1 | 12/2011 | Ferris et al. |
| 2011/0296000 A1 | 12/2011 | Ferris et al. |
| 2011/0296019 A1 | 12/2011 | Ferris et al. |
| 2011/0296022 A1 | 12/2011 | Ferris et al. |
| 2011/0296023 A1 | 12/2011 | Ferris et al. |
| 2011/0296370 A1 | 12/2011 | Ferris et al. |
| 2012/0130873 A1 | 5/2012 | Morgan |
| 2012/0131161 A1 | 5/2012 | Ferris et al. |
| 2012/0131173 A1 | 5/2012 | Ferris et al. |
| 2012/0131174 A1 | 5/2012 | Ferris et al. |
| 2012/0131176 A1 | 5/2012 | Ferris et al. |
| 2012/0131193 A1 | 5/2012 | Ferris et al. |
| 2012/0131194 A1 | 5/2012 | Morgan |
| 2012/0131195 A1 | 5/2012 | Morgan |
| 2012/0131594 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0137003 A1 | 5/2012 | Ferris et al. |
| 2012/0221454 A1 | 8/2012 | Morgan |
| 2012/0226796 A1 | 9/2012 | Morgan |
| 2012/0226808 A1 | 9/2012 | Morgan |
| 2012/0304170 A1 | 11/2012 | Morgan |
| 2012/0304191 A1 | 11/2012 | Morgan |
| 2012/0311106 A1 | 12/2012 | Morgan |
| 2012/0311153 A1 | 12/2012 | Morgan |
| 2012/0311154 A1 | 12/2012 | Morgan |
| 2012/0311571 A1 | 12/2012 | Morgan |

OTHER PUBLICATIONS

White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
USPTO, Office Action for U.S. Appl. No. 12/324,758, mailed Sep. 20, 2010.
USPTO, Office Action for U.S. Appl. No. 12/324,758, mailed Mar. 24, 2011.
USPTO, Office Action for U.S. Appl. No. 12/324,758, mailed Feb. 14, 2012.
USPTO, Office Action for U.S. Appl. No. 12/324,758, mailed Jul. 13, 2012.

(56) References Cited

OTHER PUBLICATIONS

USPTO, Office Action for U.S. Appl. No. 12/324,758, mailed Apr. 23, 2013.
USPTO, Office Action for U.S. Appl. No. 12/324,758, mailed Oct. 17, 2013.
USPTO, Office Action for U.S. Appl. No. 12/324,758, mailed Mar. 26, 2014.
USPTO, Office Action for U.S. Appl. No. 12/324,758, mailed Aug. 13, 2014.
USPTO, Notice of Allowance for U.S. Appl. No. 12/324,758, mailed Dec. 30, 2014.

* cited by examiner

MULTIPLE CLOUD MARKETPLACE AGGREGATION

RELATED APPLICATION

The present application is a continuation of U.S. patent application Ser. No. 12/324,758, filed Nov. 26, 2008, the entire contents of which are hereby incorporated by reference herein.

FIELD

The present teachings relate to systems and methods for multiple cloud marketplace aggregation, and more particularly to platforms and techniques for generating responses to resource requests from a collective set of cloud-based marketplaces and selecting from those combined offerings to instantiate or update a virtual machine or other entity.

BACKGROUND OF RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application. Another type of software entity that has found certain application in certain spaces is software appliances, which generally speaking can represent relatively self-contained software installations including full or customized partial operating system installations, combined with selected applications in a single installation or update package.

Currently, when a user desires to can lease or subscribe to the set of resources, the user may request the set of resources based on their service level requirements and then receive a price for the request from a cloud marketplace system. Currently, no mechanism exists to permit those resource requests to be distributed to multiple cloud marketplace systems, to widen the range of available options or create the opportunity for redundancy in the sources for those requested resources. Thus, there is a need in the art for methods and systems that provide an ability to distribute or fan out a resource request to multiple cloud marketplace systems or platforms, and aggregate the resulting resource offerings to select a set of sources best suited to the requesting entity's needs.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
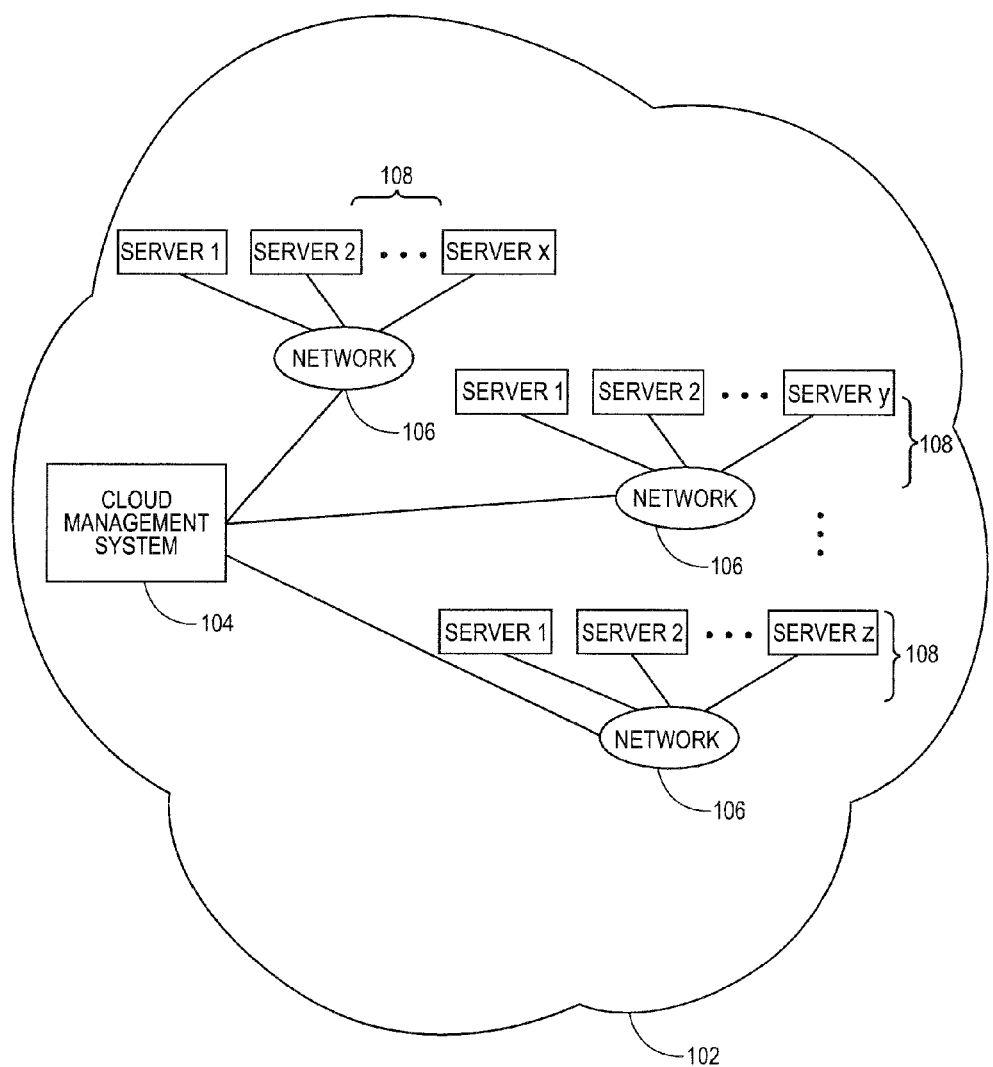
FIG. 1 illustrates an overall cloud system architecture in which various embodiments of the present teachings can be practiced.

Embodiments of the present teachings relate to systems and methods for multiple cloud marketplace aggregation. More particularly, embodiments relate to platforms and techniques for multiple marketplace aggregation in which a request for resources to instantiate or update a requesting entity can be transmitted to an aggregation engine. The aggregation engine can be configured to receive the resource request and replicate or transmit that request to a set of marketplace systems or platforms. The multiple marketplace systems can each communicate with a set of clouds from which processor, memory, software, or other resources can be requested and extracted. In embodiments, the aggregation engine can comprise a separate server, or, in embodiments, can be incorporated in a marketplace system.

The set of marketplace systems can respond to the replicated resource request with an indication of the resources that one or more of their constituent clouds are prepared to offer and deliver to the requesting virtual machine, or other requesting entity. In embodiments, the aggregation engine can employ selection logic to select one or more resource offerings from the set of marketplace systems, and provide those resources to the requesting virtual machine or other entity. In embodiments, a systems administrator or other user can manually select the desired marketplace sources from amongst the competing offerings. The aggregation engine can, in embodiments, select multiple more than one marketplace system to satisfy the request for resources, for instance to stagger the marketplace systems from which resources will be drawn at different times.

Embodiments of the present teachings thereby relate to systems and methods which operate in a marketplace environment based on cloud computing networks. More particularly, embodiments relate to platforms and techniques in which a cloud marketplace system provides details on the resources and services provided by the cloud computing environments, to allow users to evaluate the resources and services provided by the cloud computing environments in relation to the specific requirements of desired applications and/or software appliances.

According to embodiments, in general, the overall cloud marketplace system can be configured to communicate with multiple cloud computing environments in order to ascertain the details for the resources and services provided by the cloud computing environments. In particular, the cloud marketplace system can be configured to retrieve, from the cloud computing environments, resource and service data which describes the capabilities, services, status, and cost of the cloud computing environment. The resource and service data can include computing resources and services provided by the cloud computing environments, computing resources and services available in the cloud computing environments at particular time periods, cost data for computing resources and services provided by the cloud computing environments, and status data for the cloud computing environments at particular time periods.

In embodiments, in order to acquire the resource and service data, the cloud marketplace system can be configured to request the resource and service data from cloud management systems located in the cloud computing environments. Likewise, the cloud marketplace system can be configured to communicate with the resources of the cloud computing environments directly in order to obtain the resource and service data.

In embodiments, the cloud marketplace system can be configured to maintain a repository for the resource and service data in order to provide the marketplace for the cloud computing environments. The cloud marketplace system can be configured to update the repository periodically to maintain current resource and service data for the cloud computing environments. Likewise, when providing the marketplace, the cloud marketplace system can obtain the resource and service data, on-demand, and directly from the cloud computing environments.

In embodiments, to provide the marketplace, the cloud marketplace system can be configured to receive a request for information pertaining to the resources or services provided by or available in the cloud computing environments. The cloud marketplace system can be configured to search the repository for resource and service data relating to the request. Likewise, the cloud marketplace system can be configured to obtain the resource and service data directly from the cloud computing environments. Once located, the cloud marketplace system can be configured to generate a marketplace report detailing the resource and service data matching the request. The cloud marketplace system can be configured to provide the report to initiator of the request.

In embodiments, the cloud marketplace system can be configured to utilize the resource and service data to provide migration services for virtual machines initiated in the cloud computing environments. In particular, for a particular virtual machine or machines, the cloud marketplace system can be configured to receive a request to monitor the resource and service data of the cloud computing environments for the occurrence of a particular event. The event can occur when a portion of the resource and service data reaches a threshold value received in the request to migrate. The cloud marketplace system can be configured to monitor the cloud computing environments in order to determine when the resources or services data indicates the occurrence of the event. Upon occurrence of the event, the cloud marketplace system can be configured to migrate the virtual machine or machines to a new cloud computing environment with the resources and services data matching the event.

By providing a marketplace for the services and resources of cloud computing environments, users can perform efficient cost-accounting for, shopping for, and migrations of existing and planned workloads to the best possible cloud computing environment. As such, the user can locate and find the best priced and best quality service for their intended applications and/or software appliances. Reference will now be made in detail to exemplary embodiments of the present teachings, which are illustrated in the accompanying drawings. Where possible the same reference numbers will be used throughout the drawings to refer to the same or like parts.

FIG. 1 illustrates an overall cloud computing environment, in which systems and methods for multiple cloud marketplace aggregation can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
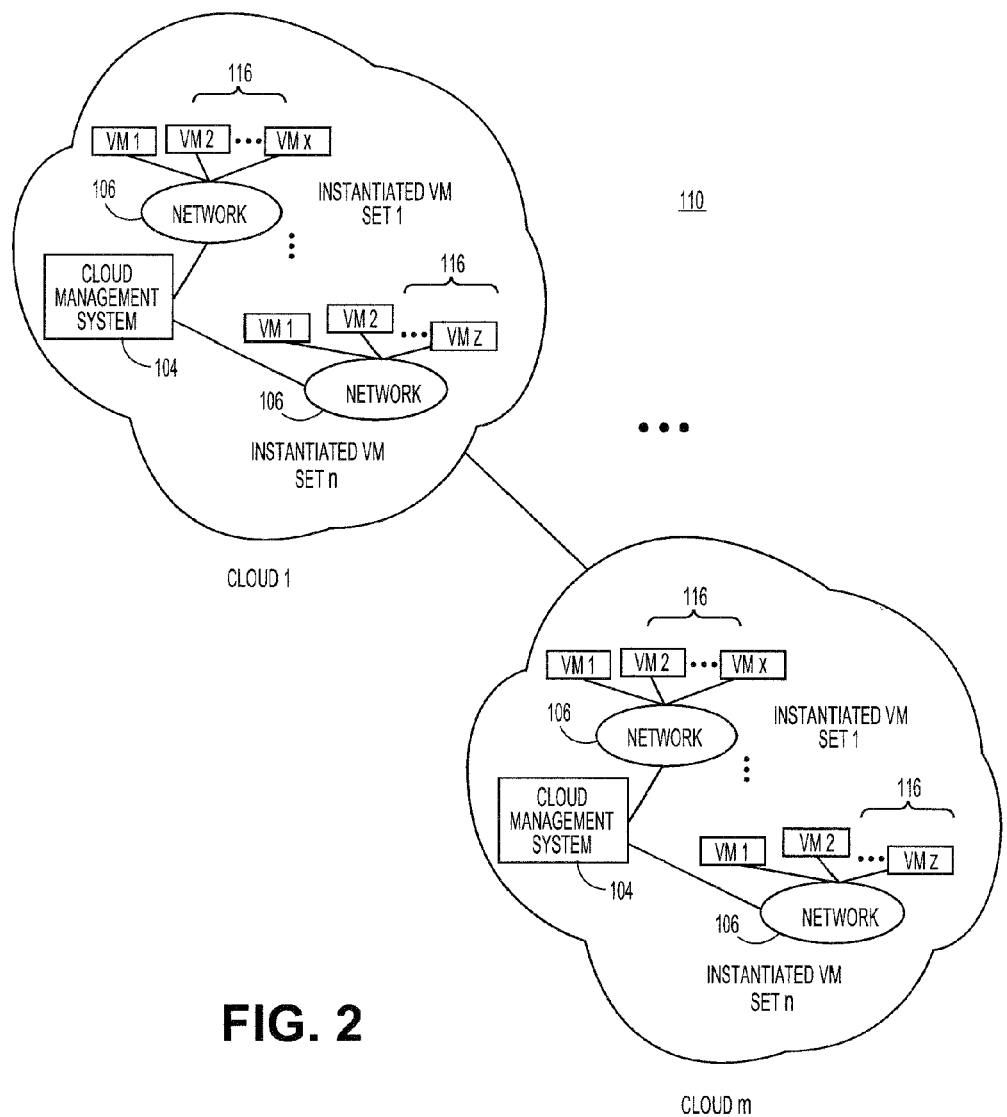
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other numbers of virtual machines to be made available to users on a network 114, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up, or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or delivery a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
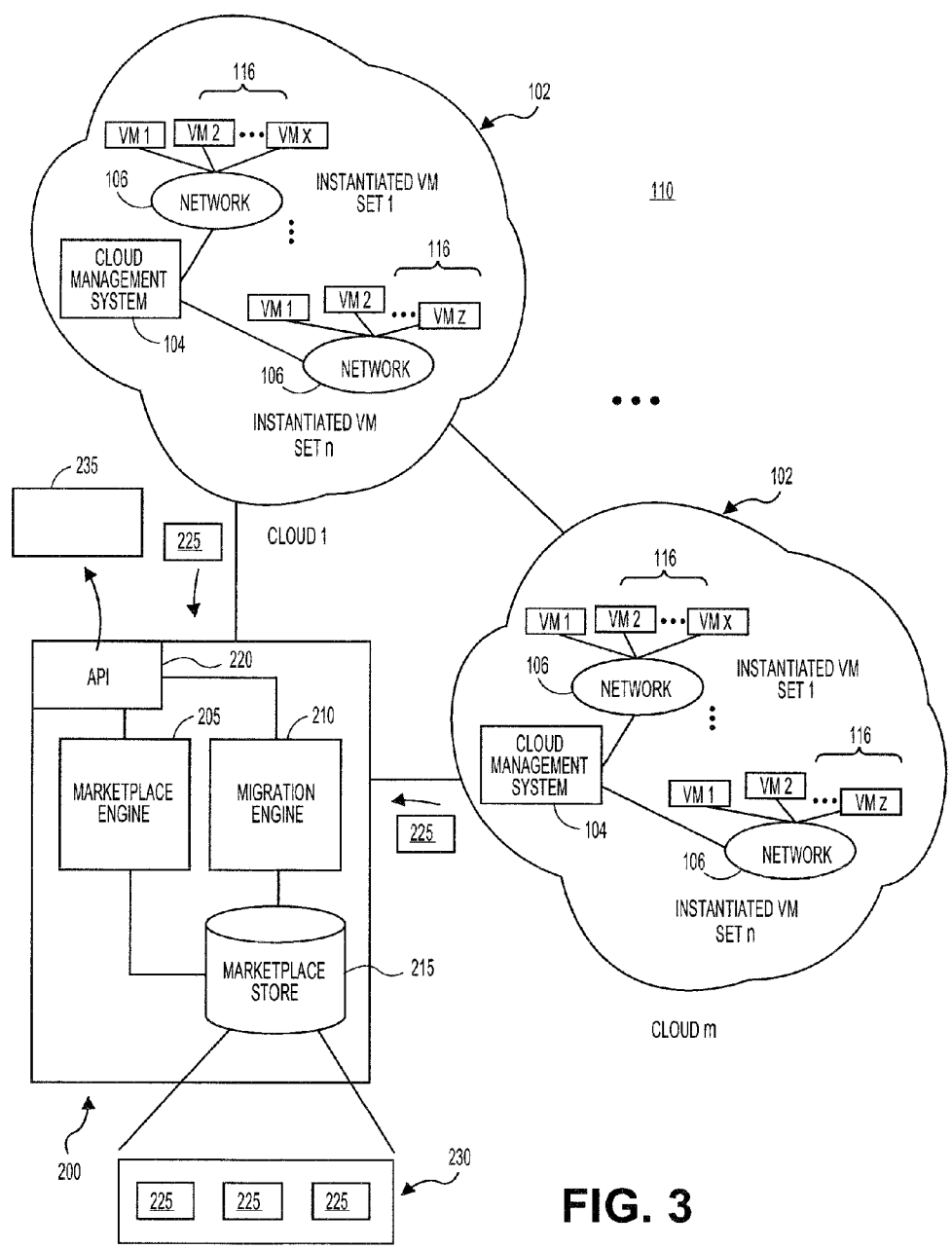
FIG. 3 illustrates an overall marketplace environment in which systems and methods for multiple cloud marketplace aggregation can operate, according to various embodiments.

FIG. 3 illustrates aspects of a cloud marketplace system 200 and its interaction with various clouds 102, according to various embodiments. In embodiments, the cloud marketplace system 200 provides a marketplace for the services provided by clouds 102. In embodiments as shown, the cloud marketplace system 200 can comprise a marketplace engine 205, a migration engine 210, a marketplace store 215, and an application programming interface (API) 220. The marketplace engine 205 can be configured to contain control logic for performing the marketplace processes and for communicating with the clouds 102, API 220, and marketplace store 215. In embodiments as shown, the cloud marketplace system 200 provides a marketplace for the services provided by clouds 102.

In embodiments, the cloud marketplace system 200 can be configured to communicate with the clouds 102 in order to ascertain the details for the resources and services provided by the clouds 102. In particular, the cloud marketplace system 200 can be configured to retrieve, from the clouds 102, resource and service data 225 which describes the capabilities, services, status, and cost of the clouds 102. The resource and service data 225 can include data detailing computing resources and services provided by the clouds 102, computing resources and services available in the clouds 102 at particular time periods, cost for the services provided by the clouds 102, and status for the clouds 102 at particular time periods.

In embodiments, the data detailing the computing resources and services provided by the clouds 102 can include resource data specifying the sets of resources servers 108 contained in the clouds 102 and the computing resources provided by the sets of resources servers 108 (computing cycles, bandwidth, memory, storage). Additionally, the data detailing the computing resources and services provided by the clouds 102 can include service data specifying particular services provided by the clouds 102 such as identity management services, cloud management services, application and appliance building services, and the like.

In embodiments, the data detailing the computing resources and services available in the clouds 102 at particular time periods can include data specifying computing resources and services available in the clouds 102 current or at some future time. Additionally, the data detailing the computing resources and services available in the clouds 102 at particular time periods can include data specifying service level agreements for the cloud 102 for a period of time.

In embodiments, the data detailing the cost for the resources and services provided by the clouds 102 can include data such as the cost for subscription to the clouds 102, the cost for usage of the resources and services of the clouds 102, and discounts of the costs based on the usage. For example, the cost for usage can include the cost for the resources consumed to support the virtual machines and can include the cost for the utilization of the virtual machines by the user or third parties. These can include the cost for the instantiated time of the virtual machines, the computing resource consumed by the virtual machines (computing cycles, bandwidth), the time frame of the computing resource consumption (peak time, off-peak time), and combinations thereof. The cost data can include cost data for a current time or cost data for resources and services in the future.

In embodiments, the data detailing the status for the clouds 102 at particular time periods can include data specifying the resources and services current being utilized in the clouds 102. For example, the status data can include virtual machines currently instantiated in the clouds 102 and the computing resources of the sets of resources servers 108 (computing cycles, bandwidth, memory, storage) currently utilized.

In embodiments, in order to acquire the resource and service data 225, the cloud marketplace system 200 can be configured to request the resource and service data 225 from cloud management systems 104 located in the clouds 102. Likewise, the cloud marketplace system 200 can be configured to communicate with the set of resource servers 108 directly in order to obtain the resource and service data 225. The cloud marketplace system 200 can be configured to communicate with the clouds 102 via network 106 or any other available public or private network. In particular, marketplace engine 205 can be configured to communicate with the clouds 102.

In embodiments, the cloud marketplace system 200 can be configured to maintain a repository 230 for the resource and service data 225 in order to provide the marketplace for the clouds 102. In particular, the marketplace engine 205 can be configured to maintain the repository 230. The repository 230 can be configured in any format to allow the resource and service data 225 to be stored and retrieved. For example, the repository can be configured in any type of proprietary or open-source database format. The repository 230 can include a record for each cloud 102 that includes various searchable data fields for storing the resource and service data 225 for that particular cloud.

The cloud marketplace system 200 can be configured to update the repository 230 periodically to maintain current resource and service data 225 for the clouds 102. Likewise, when providing the marketplace, the cloud marketplace system 200 can be configured to obtain the resource and service data 225, on-demand, and directly from the clouds 102.

In embodiments, to provide the marketplace, the cloud marketplace system 200 can be configured receive a request for information pertaining to the resources or services provided by or available in the clouds 102. For example, an initiator may request information on clouds 102 that can provide a certain level of computing resources at a specific cost during a specific time period. The initiator may request the information in order to see all available resources of the clouds 102 that may meet the initiator's requirements. As such, the request can include the information regarding the resources desired by the initiator. This can include the desired computing resources, the time period for the resources, the duration of the resources, the cost of the resources, services provided by the cloud, the availability of the resources, and the like.

In particular, the marketplace engine 205 can be configured to communicate with the initiator of the request via API 220. API 220 can be configured to generate GUIs, e.g. dialog boxes, web pages, as required by marketplace engine 205 and to provide an interface for receiving requests. The initiator of the request can be a user desiring utilization of the clouds 102 or the cloud management systems 104 of the clouds 102.

Once the request is received, the cloud marketplace system 200 can be configured to search the repository 230 for resource and service data 225 relating to the request. In particular, the marketplace engine 205 can be configured to access the repository 230 stored in marketplace store 215 and search the repository 230 for resource and service data 225 matching the request. Likewise, the cloud marketplace system 200 can be configured to obtain the resource and service data 225 directly from the clouds 102.

Once located, the cloud marketplace system 200 can be configured to generate a marketplace report 235 detailing the resource and service data 225 matching the request. For example, the marketplace report 235 can include a list of clouds 102 matching the request alone with the data detailing computing resources and services provided by the matching clouds 102, computing resources and services available in the matching clouds 102 at particular time periods specified in the request, cost for the services and resources requested, and status for the matching clouds 102 at particular time periods specified in the request.

In particular, the marketplace engine 205 can be configured to extract the matching resource and service data from repository 230. Marketplace engine 205 can be configured to arrange the matching resource and service data 225 in marketplace report 235.

After generating the marketplace report 235, the cloud marketplace system 200 can be configured to provide the marketplace report 235 to the initiator of the request. In particular, the marketplace engine 205 can be configured to provide the marketplace report 235 via API 220.

Once the report is received, the initiator or the user can make a determination on which resources of the clouds 102 to utilize. This can include utilizing resources from a single cloud 102 or resources from multiple clouds 102. For example, the initiator can select one or more clouds 102 with which to instantiate a virtual machine or machines. The initiator can make a request for the resources directly to the clouds 102. Likewise, the cloud marketplace system 200 can be configured to receive the initiator's requests for resources and forward the request to the clouds 102, or reserve the resources directly.

In embodiments, the cloud marketplace system 200 can be configured to utilize the resource and service data to provide automatic migration services for virtual machines initiated in the clouds 102. In particular, the migration engine 210 can be configured to contain control logic for performing the migration processes and for communicating with the clouds 102, API 220, and marketplace store 215.

In embodiments, for a particular virtual machine or machines instantiated in one of the clouds 102, the cloud marketplace system 200 can be configured to receive a request to monitor the resource and service data 225 of the clouds 102 for the occurrence of a particular event. The event can be the occurrence of a particular resource or service becoming available in a cloud 102. The event can be occur when a portion of the resource and service data 225 reaches a threshold value received in the request to migrate. For example, a user can request that the cloud marketplace system 200 migrate a virtual machine or machines when a particular computing resources at a specified cost becomes available in one of the clouds 102.

In particular, the migration engine 210 can be configured to communicate with the user or the initiator of the request via API 220. API 220 can be configured to generate GUIs, e.g. dialog boxes, web pages, as required by migration engine 210 and to provide an interface for receiving requests.

To migrate the virtual machine or machines, the cloud marketplace system 200 can be configured to monitor the clouds 102 in order to determine when the resources or services data 225 indicates the occurrence of the event. In particular, the migration engine 210 can be configured to periodically search the repository 230 for the resources and services data 225 matching event. Likewise, the migration engine 210 can be configured to obtain the resource and service data 225, periodically, directly from the clouds 102.

Upon occurrence of the event, the cloud marketplace system 200 can be configured to migrate the virtual machine or machines to a new cloud 102 with the resources and services data matching the event. For example, the cloud marketplace system 200 can determine that a new cloud 102 has resources or services available that match the user's request and can migrate the virtual machines to the new cloud 102. In particular, the migration engine 210 can be configured send an instruction, to the cloud 102 currently instantiating the virtual machine or machines, to migrate the virtual machine or machines to the new cloud 102. The instruction can include an identification of the virtual machine or machines and an identification of the new cloud 102. Likewise, the migration engine 210 can be configured to retrieve the virtual machine or machines from the cloud 102 currently instantiating the virtual machine or machines and pass the virtual machine or machines to the new cloud 102 for instantiation.

Once migrated, the cloud marketplace system 200 can be configured to notify the user or initiator of the migration. In particular, migration engine 210 can be configured to notify the user or initiator via API 220.

Figure 4:
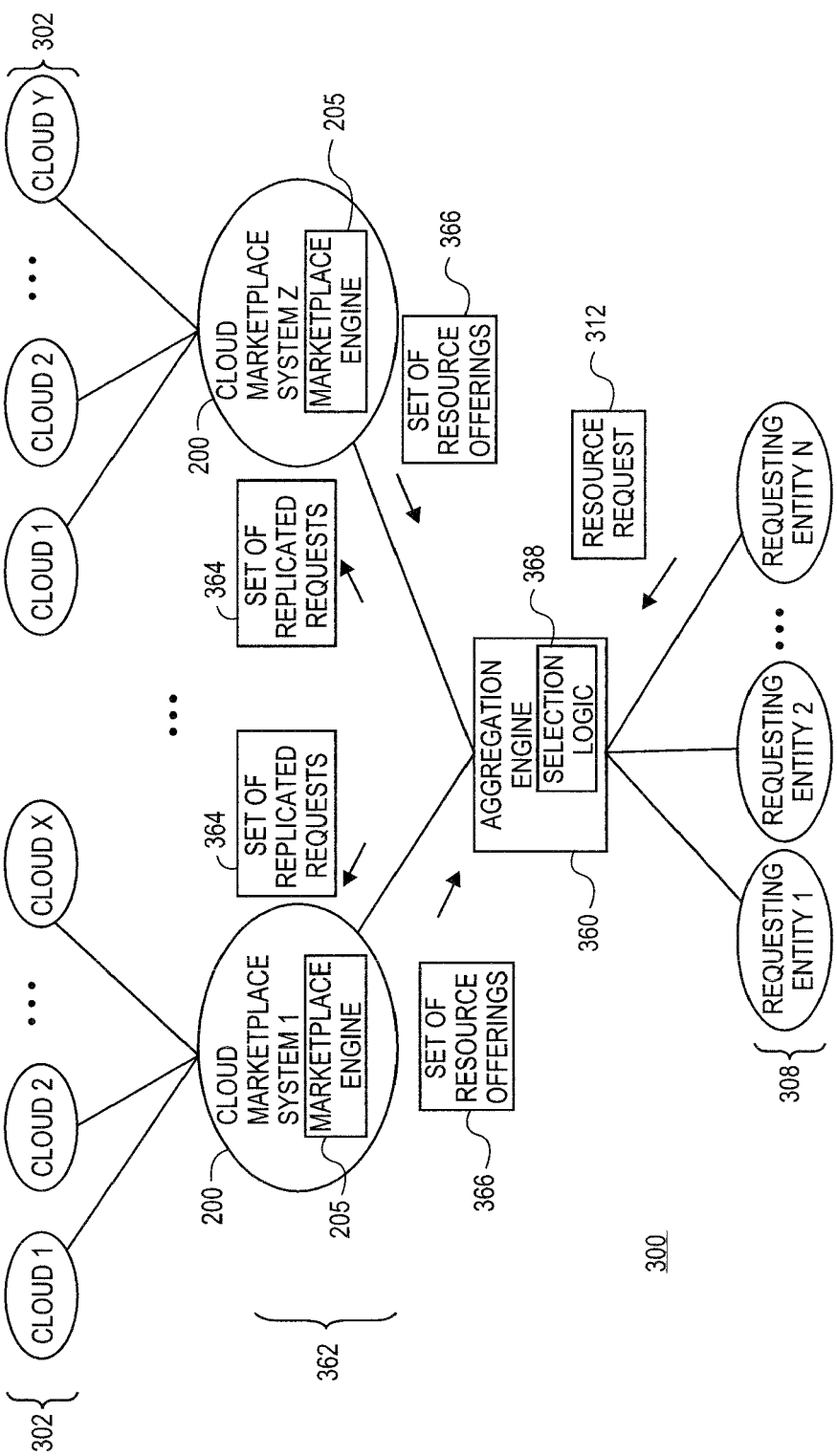
FIG. 4 illustrates an overall marketplace environment in which systems and methods for multiple cloud marketplace aggregation can operate including request distribution and resource aggregation, according to various embodiments.

FIG. 4 illustrates an overall system 300, consistent with systems and methods for multiple cloud marketplace aggregation, according to various embodiments. In embodiments as shown, a set of requesting entities 308 can communicate with an aggregation engine 360 to transmit a resource request 312 to aggregation engine 360. In embodiments, the resource request 312 can contain or encode a request for a set of specified resources from cloud sources. In embodiments, the requested resources can include, for instance, processor cycles, memory allocation, installed applications, operating systems, service levels under a service level agreement (SLA), and/or other hardware, software, network, input/output (I/O), and/or other resources.

The aggregation engine 360 can receive the resource request 312 and decode that request to determine the corresponding, hardware, software, network, input/output (I/O), and/or other resources necessary to satisfy the request. Aggregation engine 360 can in turn transmit a set of replicated requests 364 to marketplace systems 200 within a set of multiple cloud marketplaces 362. In embodiments as shown, each individual marketplace system 200 can likewise in turn communicate with a set of clouds 302 to identify resources available with those cloud networks to potentially satisfy the resource request 312. After interrogating associated clouds in set of clouds 302, each individual marketplace system 200 can generate a set of resource offerings 366 representing the hardware, software, network, input/output, and/or other resources that particular marketplace system 200 along with its associated set of clouds 302 is prepared to delivery to the requesting entity. Each marketplace system 200 can transmit the set of resource offerings to aggregation engine 360. It may be noted that although a configuration is illustrated in FIG. 4 in which aggregation engine 360 communicates with set of multiple cloud marketplaces 362 in a generally parallel configuration, in various embodiments, the individual marketplace systems 200 can be arranged in a serial configuration, in a mixed serial/parallel configuration, or in other configurations. In embodiments, the individual marketplace systems 200 can be configured in multiple layers or levels, likewise in various parallel, serial, mixed serial/parallel, and/or other configurations.

Aggregation engine 360 can receive the various sets of resource offerings 366, and examine that information to determine which marketplace system(s) 200 and associated set(s) of clouds 302 will be utilized to supply the resources specified in the resource request 312. Aggregation engine 360 can host selection logic 368 to select between the various sets of resource offerings 366. Selection logic 368 can, for example, identify resources most closely matching a requested service level agreement (SLA), or other hardware, software, network, input/output (I/O) and/or other resources or factors. Selection logic 368 can incorporate selection based on cost factors. Selection logic 368 can likewise base selection of resources on scheduled resource availability, and can, for example, sequence or stagger individual marketplace systems 200 to supply different resources at different times. Other selection criteria are possible.

After identifying the marketplace system(s) 200 from set of multiple marketplace systems 362, aggregation engine 360 can manage the instantiation and/or delivery of the constituent resources to the requesting entity(ies) in set of requesting entities 308. For example, aggregation engine 360 and/or other logic can instantiate, access, transmit, or otherwise provide hardware, software, network, input/output (I/O) and/or resources to the requesting entity. The result of the resource delivery can be, for example, the instantiation or updating of a virtual machine, including for example virtual clients and/or software appliances, as well as the installation of one or more software applications, the delivery of data, the provisioning of service level agreements (SLAs), or other cloud activity.

Figure 5:
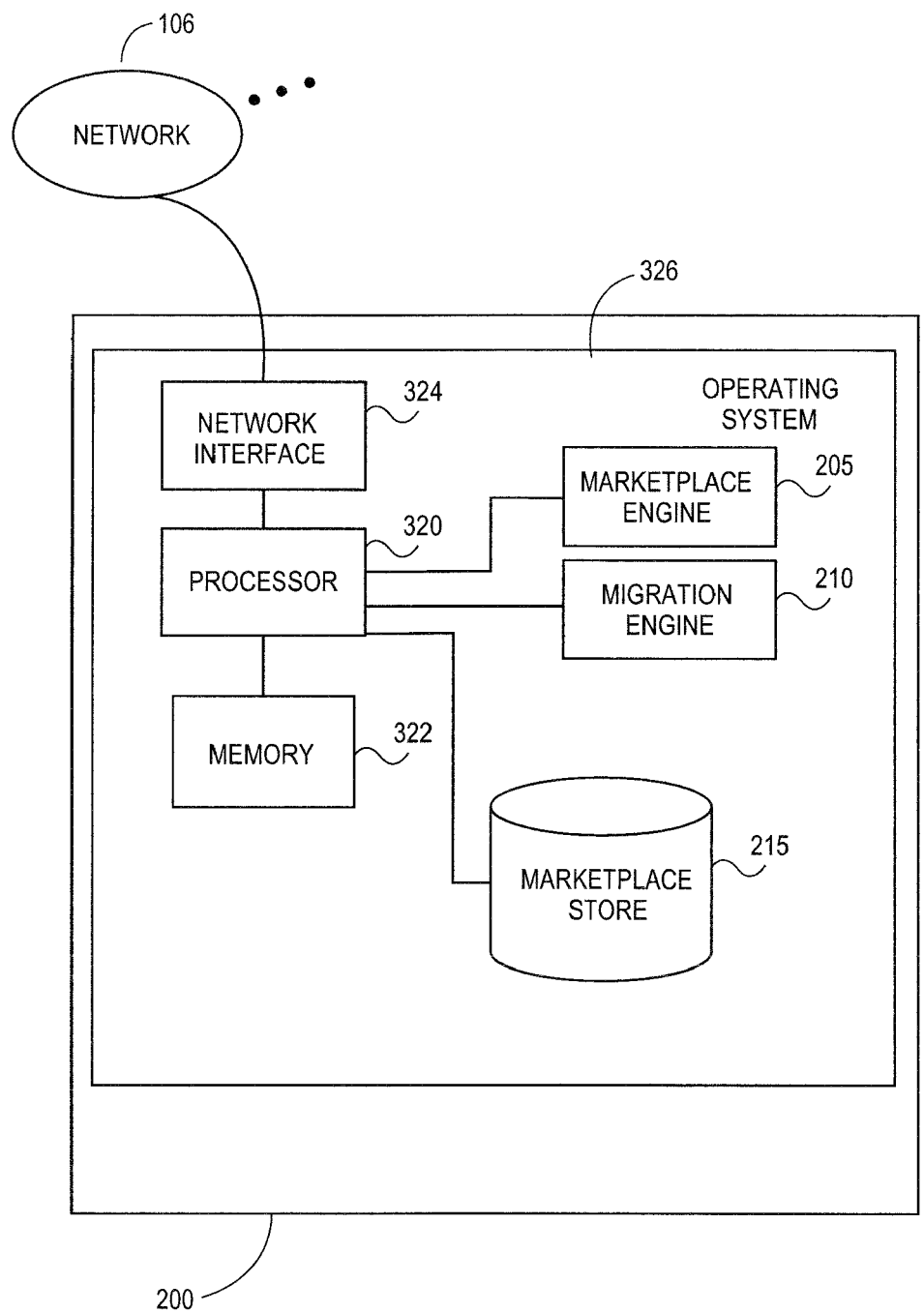
FIG. 5 illustrates an exemplary hardware implementation of a marketplace system, according to various embodiments.

FIG. 5 illustrates an exemplary diagram of hardware and other resources that can be incorporated in a cloud marketplace system 200 configured to communicate with instantiated clouds 102, set of clouds 302, and users or initiators via one or more networks 106, according to embodiments. In embodiments as shown, the cloud marketplace system 200 can comprise a processor 320 communicating with memory 322, such as electronic random access memory, operating under control of or in conjunction with operating system 326. Operating system 326 can be, for example, a distribution of the Linux™ operating system, the Unix™ operating system, or other open-source or proprietary operating system or platform. Processor 320 also communicates with the marketplace store 215, such as a database stored on a local hard drive. Processor 320 further communicates with network interface 324, such as an Ethernet or wireless data connection, which in turn communicates with one or more networks 106, such as the Internet or other public or private networks. Processor 320 also communicates with marketplace store 215 and the marketplace engine 205, to execute control logic and perform the marketplace process described herein. Additionally, processor 320 also communicates with marketplace store 215 and the migration engine 210, to execute control logic and perform the migration process described above. Other configurations of the cloud marketplace system 200, associated network connections, and other hardware and software resources are possible.

While FIG. 5 illustrates the cloud marketplace system 200 as a standalone system comprises a combination of hardware and software, the cloud marketplace system 200 can also be implemented as a software application or program capable of being executed by a convention computer platform. Likewise, the cloud marketplace system 200 can also be implemented as a software module or program module capable of being incorporated in other software applications and programs. In either case, the cloud marketplace system 200 can be implemented in any type of conventional proprietary or open-source computer language.

Additionally, as illustrated in FIG. 5, the cloud marketplace system 200 can be a standalone system capable of being access by or controlled by a user or initiator of the marketplace and migration processes. Likewise, the cloud marketplace system 200 can be integrated into one or more of the clouds 102. Additionally, the cloud marketplace system 200 can be integrated into one or more of the systems of the clouds 102 such as the cloud management systems.

Figure 6:
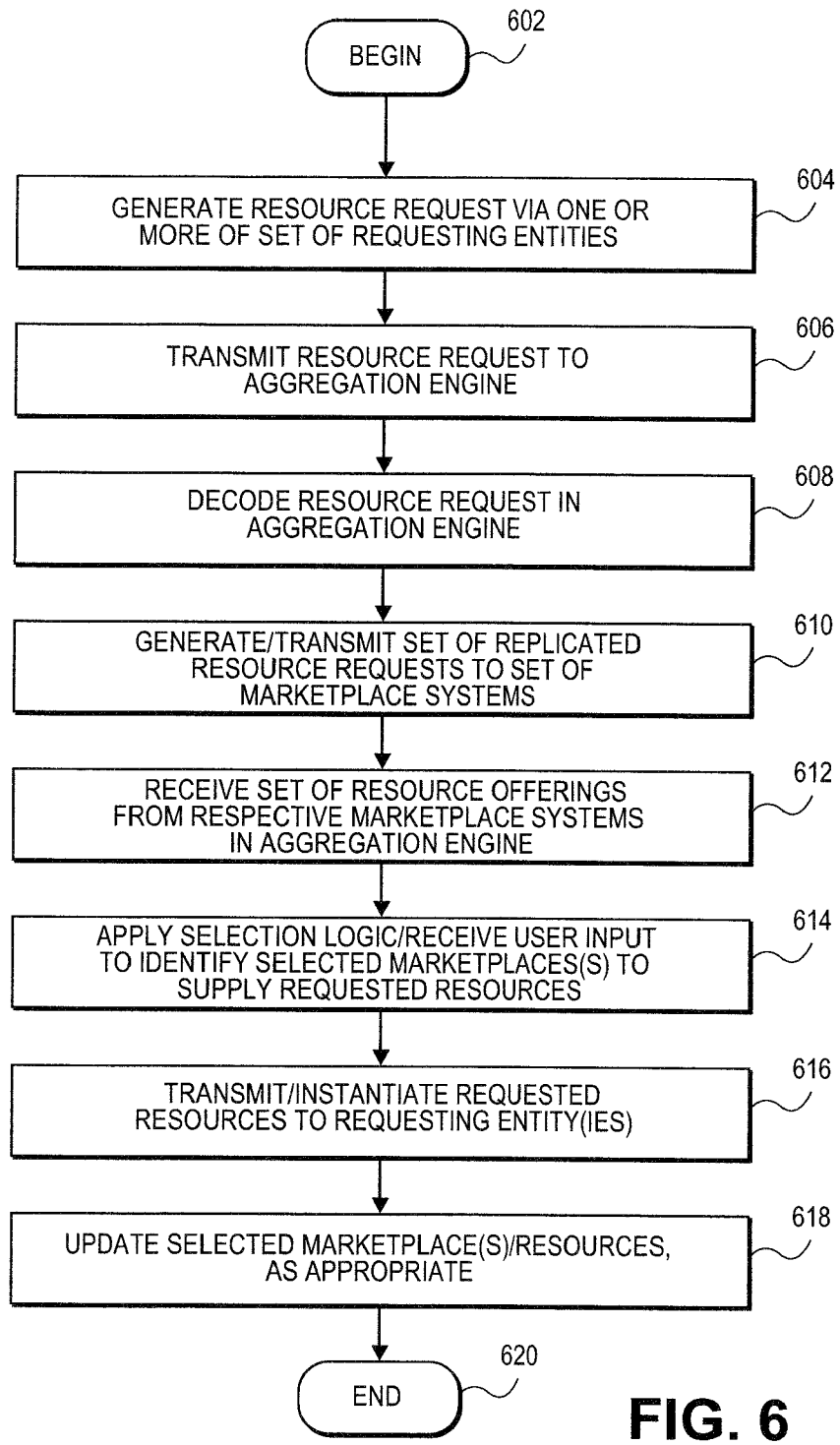
FIG. 6 illustrates a flowchart of overall processing for multiple cloud marketplace aggregation, according to various embodiments.

FIG. 6 illustrates a flowchart of processing for multiple cloud marketplace aggregation, according to various embodiments. In 602, processing can begin. In 604, at least one of a set of requesting entities can generate a resource request 312. For example, a resource request 312 can be generated for a set of messaging, browser, or other applications that a user or resource wishes to install in or from a cloud. In 606, the resource request 312 can be transmitted to an aggregation engine 360. In 608, the resource request 312 can be decoded in aggregation engine 360. In embodiments, for example, a request to install an operating system in a virtual machine can be decoded to identify a version of operating system, and minimum necessary processor cycles, memory, and/or other resources.

In 610, the aggregation engine 360 can generate and transmit a set of replicated resource requests 364 to a set of multiple cloud marketplaces 362. In embodiments, set of multiple cloud marketplaces 362 can contain multiple marketplace systems 200, which in embodiments can be of similar or diverse type, capability, and/or location. In 612, the marketplace systems 200 of the set of multiple cloud marketplaces 362 can generate a set of resource offerings 366, and transmit those offerings to aggregation engine 360. In 614, the aggregation engine 360 can apply selection logic 368 to the set of resource offerings 366 to identify the resources and marketplace(s) that will be invoked to satisfy the resource request 312. In embodiments, selection logic 368 can examine set of resource offerings 366 to select resources, marketplace(s), and/or cloud(s) based on criteria such as subscription or other cost, processing performance, service availability under a service level agreement (SLA), and/or other factors. In embodiments, in addition to or instead of selection logic 368, a user can supply input to select from among the set of resource offerings 366.

In 616, the selected resources can be transmitted from and/or instantiated via aggregation engine 360 and associated cloud resources to the one or more requesting entities in set of requesting entities 308. In 618, the selected marketplace(s), cloud(s), and/or other resources can be updated, as appropriate, for example as a result of a change in one or more marketplace systems 200, and/or receipt of a new or updated resource request 312. In 630, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which a single aggregation engine 360 supports the resource requests of a set of requesting entities 308, in embodiments, multiple aggregation engines, servers, or logic can communicate with the set of requesting entities 308 to build virtual machines or other objects from resources produced by the set of multiple cloud marketplaces 362. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   replicating, by a processor, a request for a computer resource to a plurality of clouds;
   updating, by the processor, a repository in view of resource offerings received from the plurality of clouds, wherein the repository stores resource and service data for each cloud of the plurality of clouds;
   determining from the updating of the repository that a single cloud of the plurality of clouds does not have resource offerings to provide the computer resource to satisfy the request;
   identifying, by the processor, from the updating of the resource and service data in the repository, a first cloud of the plurality of clouds to provide a first portion of the computer resource and a second cloud of the plurality of clouds to provide a remaining portion of the computer resource to satisfy the request; and
   providing information to a requesting entity indicating resource and service data in the repository that satisfy the request.

2. The method of claim 1, wherein the request is to migrate a plurality of virtual machines and the information in the request specifies an event defined by a threshold value to be applied to the resource and service data in the repository.

3. The method of claim 2, wherein identifying comprises searching the resource and service data in the repository for resource and service data matching the event.

4. The method of claim 2, wherein providing the information to the requesting entity comprises:
   migrating the plurality of virtual machines to the first cloud and the second cloud having resource and service data matching the event; and
   notifying the requesting entity of the migrating.

5. The method of claim 1, wherein the request specifies at least one of a processor resource, memory resource, input/output (I/O) resource, application resource, operating system resource, or service level represented by a service level agreement.

6. The method of claim 5, wherein identifying comprises searching the resource and service data in the repository for resource and service data that matches the specified at least one of processor resource, memory resource, input/output (I/O) resource, application resource, operating system resource, or service level represented by a service level agreement in the request.

7. The method of claim 5, wherein providing the information to the requesting entity comprises:
   extracting resource and service data from the repository that matches the information specified in the request;
   generating a report comprising the resource and service data extracted from the repository; and
   providing the report to the requesting entity.

8. The method of claim 1, further comprising providing one or more resources to the requesting entity.

9. A system comprising:
   a memory;
   a processor, operatively coupled to the memory, the processor to:

replicate a request for a computer resource to a plurality of clouds;

update a repository in view of resource offerings received from the plurality of clouds, wherein the repository stores resource and service data for each cloud of the plurality of clouds;

determine from the updating of the repository that a single cloud of the plurality of clouds does not have resource offerings to provide the computer resource to satisfy the request;

identify from the updating of the resource and service data in the repository, a first cloud of the plurality of clouds to provide a first portion of the computer resource and a second cloud of the plurality of clouds to provide a remaining portion of the computer resource to satisfy the request; and provide information to a requesting entity indicating resource and service data in the repository that satisfy the request.

10. The system of claim 9, wherein the request is to migrate a plurality of virtual machines and the information in the request specifies an event defined by a threshold value to be applied to the resource and service data in the repository.

11. The system of claim 10, wherein to identify comprises the processor to search the resource and service data in the repository for resource and service data matching the event.

12. The system of claim 10, wherein to provide comprises the processor to:

migrate the plurality of virtual machines to the first cloud and the second cloud having resource and service data matching the event; and notify the requesting entity of the migrating.

13. The system of claim 9, wherein the request specifies at least one of a processor resource, memory resource, input/output (I/O) resource, application resource, operating system resource, or service level represented by a service level agreement.

14. The system of claim 13, wherein to identify comprises the processor to search the resource and service data in the repository for resource and service data that matches the specified at least one of processor resource, memory resource, input/output (I/O) resource, application resource, operating system resource, or service level represented by a service level agreement in the request.

15. The system of claim 13, wherein to provide comprises the processor to:

extract resource and service data from the repository that matches the information specified in the request;

generate a report comprising the resource and service data extracted from the repository; and provide the report to the requesting entity.

16. The system of claim 9, wherein the processor is further to provide one or more resources to the requesting entity.

17. A non-transitory computer readable storage medium including instructions that, when executed by a processor, cause the processor to:

replicate, by the processor, a request for a computer resource to a plurality of clouds;

update a repository in view of resource offerings received from the plurality of clouds, wherein the repository stores resource and service data for each cloud of the plurality of clouds;

determine from the updating of the repository that a single cloud of the plurality of clouds does not have resource offerings to provide the computer resource to satisfy the request;

identify, from the updating of the resource and service data in the repository, a first cloud of the plurality of clouds to provide a first portion of the computer resource and a second cloud of the plurality of clouds to provide a remaining portion of the computer resource to satisfy the request; and provide information to a requesting entity indicating resource and service data in the repository that satisfy the request.

18. The non-transitory computer readable storage medium of claim 17, wherein the request is to migrate a plurality of virtual machines and the information in the request specifies an event defined by a threshold value to be applied to the resource and service data in the repository, and the identifying of resource and service data in the repository comprises searching the resource and service data in the repository for resource and service data matching the event.

19. The non-transitory computer readable storage medium of claim 18, wherein to provide the information to the requesting entity comprises the processor to:

migrate the plurality of virtual machines to the first cloud and the second cloud having resource and service data matching the event; and notify the requesting entity of the migrating.

20. The non-transitory computer readable storage medium of claim 17, wherein the request specifies at least one of a processor resource, memory resource, input/output (I/O) resource, application resource, operating system resource, or service level represented by a service level agreement, and the identifying of resource and service data in the repository comprises:

searching the resource and service data in the repository for resource and service data that matches the specified at least one of processor resource, memory resource, input/output (I/O) resource, application resource, operating system resource, or service level represented by a service level agreement in the request.

* * * * *